US011388369B2

(12) United States Patent
Moriwaki

(10) Patent No.: US 11,388,369 B2
(45) Date of Patent: Jul. 12, 2022

(54) VIDEO DEVICE AND CONTROL METHOD FOR VIDEO DEVICE

(71) Applicant: NEC Display Solutions, Ltd., Tokyo (JP)

(72) Inventor: Daisuke Moriwaki, Tokyo (JP)

(73) Assignee: SHARP NEC DISPLAY SOLUTIONS, LTD., Tokyo (JP)

( * ) Notice: Subject to any disclaimer, the term of this patent is extended or adjusted under 35 U.S.C. 154(b) by 0 days.

(21) Appl. No.: 16/766,178

(22) PCT Filed: Nov. 27, 2017

(86) PCT No.: PCT/JP2017/042358
§ 371 (c)(1),
(2) Date: May 21, 2020

(87) PCT Pub. No.: WO2019/102607
PCT Pub. Date: May 31, 2019

(65) Prior Publication Data
US 2020/0366866 A1    Nov. 19, 2020

(51) Int. Cl.
*H04N 21/436* (2011.01)
*H04N 7/10* (2006.01)
*H04N 5/775* (2006.01)

(52) U.S. Cl.
CPC ............. *H04N 7/104* (2013.01); *H04N 5/775* (2013.01); *H04N 21/43607* (2013.01)

(58) Field of Classification Search
CPC .. H04N 7/104; H04N 5/775; H04N 21/43607; H04N 21/426; H04N 21/436; H04N 21/43615; H04N 21/6106
See application file for complete search history.

(56) References Cited

U.S. PATENT DOCUMENTS 5,374,994 A      12/1994    Kimura
2006/0012713 A1*  1/2006    Kim .................. H04N 5/775
                                                  348/552
(Continued)

FOREIGN PATENT DOCUMENTS

CN          1805528 A       7/2006
CN        103702055 A       4/2014
(Continued)

OTHER PUBLICATIONS

International Search Report (ISR) (PCT Form PCT/ISA/210), in PCT/JP2017/042358, dated Jan. 23, 2018.
(Continued)

*Primary Examiner* — William J Kim
(74) *Attorney, Agent, or Firm* — McGinn I.P. Law Group, PLLC.

(57) ABSTRACT

A video device includes: a first video signal terminal to which a video signal cable for transmitting a video signal is detachably connected; a second video signal terminal which is of the same shape as that of the first video signal terminal, and to which the video signal cable is detachably connected; a detection unit which detects a predetermined state in the first video signal terminal and the second video signal terminal; a first video signal switch which connects the first video signal terminal to either an input unit or an output unit; a second video signal switch which connects the second video signal terminal to either the input unit or the output unit; and a control unit which controls a connection state of the first video signal switch and a connection state of the second video signal switch according to a detection result of the detection unit.

18 Claims, 9 Drawing Sheets

(56) References Cited

U.S. PATENT DOCUMENTS

| | | | | |
|---|---|---|---|---|
| 2016/0005378 A1* | 1/2016 | Abe | ................ | G09G 5/003 345/520 |
| 2016/0140075 A1* | 5/2016 | Kashyap | ............ | G06F 13/4265 710/104 |
| 2016/0142648 A1* | 5/2016 | Gopinath | ............ | H04N 5/4403 348/705 |

FOREIGN PATENT DOCUMENTS

| | | | |
|---|---|---|---|
| JP | H05-145862 A | 6/1993 | |
| JP | 2006-287408 A | 10/2006 | |
| JP | 2007-104314 A | 4/2007 | |
| JP | 2009-194534 A | 8/2009 | |
| JP | 4898933 B2 * | 3/2012 | ......... H04N 21/4122 |
| JP | 2014-160937 A | 9/2014 | |
| JP | 2014-165738 A | 9/2014 | |
| JP | 2014160937 A * | 9/2014 | |

OTHER PUBLICATIONS

Chinese Office Action, dated Aug. 30, 2021, in Chinese Application No. 201780097170.8 and English Translation thereof.

* cited by examiner

VIDEO DEVICE AND CONTROL METHOD FOR VIDEO DEVICE

TECHNICAL FIELD

The present invention relates to a video device and a control method for a video device.

BACKGROUND ART

Patent Document 1 discloses a configuration for accurately detecting an incorrect connection with an external device in a video device in which an input connector and an output connector are of the same shape.

CITATION LIST

Patent Literature

[Patent Document 1] Japanese Unexamined Patent Application, First Publication NO. 2014-165738

SUMMARY OF THE INVENTION

Problems to be Solved by the Invention

As disclosed in Patent Document 1, video devices in which an input connector thereof and an output connector thereof are of the same shape have a problem that correct connection may not be established unless video signal cables are connected while particular attention is paid to input and output. For example, if a video signal cable, one end of which is already connected to an input terminal of another video device, has the other end thereof connected to an input terminal of a video device, correct displaying of video images cannot be performed. Such an incorrect connection may occur, for example, when daisy-chaining a plurality of video devices or when connecting a single video device having a plurality of input/output connectors to a video playback device or the like using video signal cables.

The present invention takes into consideration the above circumstances, with an object of providing a video device which enables an operator to connect video signal cables without having to pay particular attention to input/output of a terminal of the video device, and a control method for a video device.

Means for Solving the Problem

In order to solve the above problem, an exemplary aspect of the present invention is a video device comprising: a video signal processing unit which has an input unit and an output unit for a video signal, and outputs, from the output unit, the video signal input from the input unit; a first video signal terminal to which a video signal cable for transmitting the video signal is detachably connected; a second video signal terminal which is of the same shape as that of the first video signal terminal, and to which the video signal cable is detachably connected; a detection unit which detects a predetermined state in the first video signal terminal and the second video signal terminal; a first video signal switch which connects the first video signal terminal to either the input unit or the output unit; a second video signal switch which connects the second video signal terminal to either the input unit or the output unit; and a control unit which controls a connection state of the first video signal switch and a connection state of the second video signal switch according to a detection result of the detection unit.

An exemplary aspect of the present invention is a control method for a video device which includes: a video signal processing unit which has an input unit and an output unit for a video signal, and outputs, from the output unit, the video signal input from the input unit; a first video signal terminal to which a video signal cable for transmitting the video signal is detachably connected; a second video signal terminal which is of the same shape as that of the first video signal terminal, and to which the video signal cable is detachably connected; a first video signal switch which connects the first video signal terminal to either the input unit or the output unit; and a second video signal switch which connects the second video signal terminal to either the input unit or the output unit, the control method comprising: detecting a predetermined state in the first video signal terminal and the second video signal terminal; and controlling a connection state of the first video signal switch and a connection state of the second video signal switch according to the detection result.

Advantageous Effects of Invention

According to the present invention, an operator can connect video signal cables without having to pay particular attention to input/output of terminals of a video device.

DESCRIPTION OF EMBODIMENTS

First Exemplary Embodiment

Figure 1:
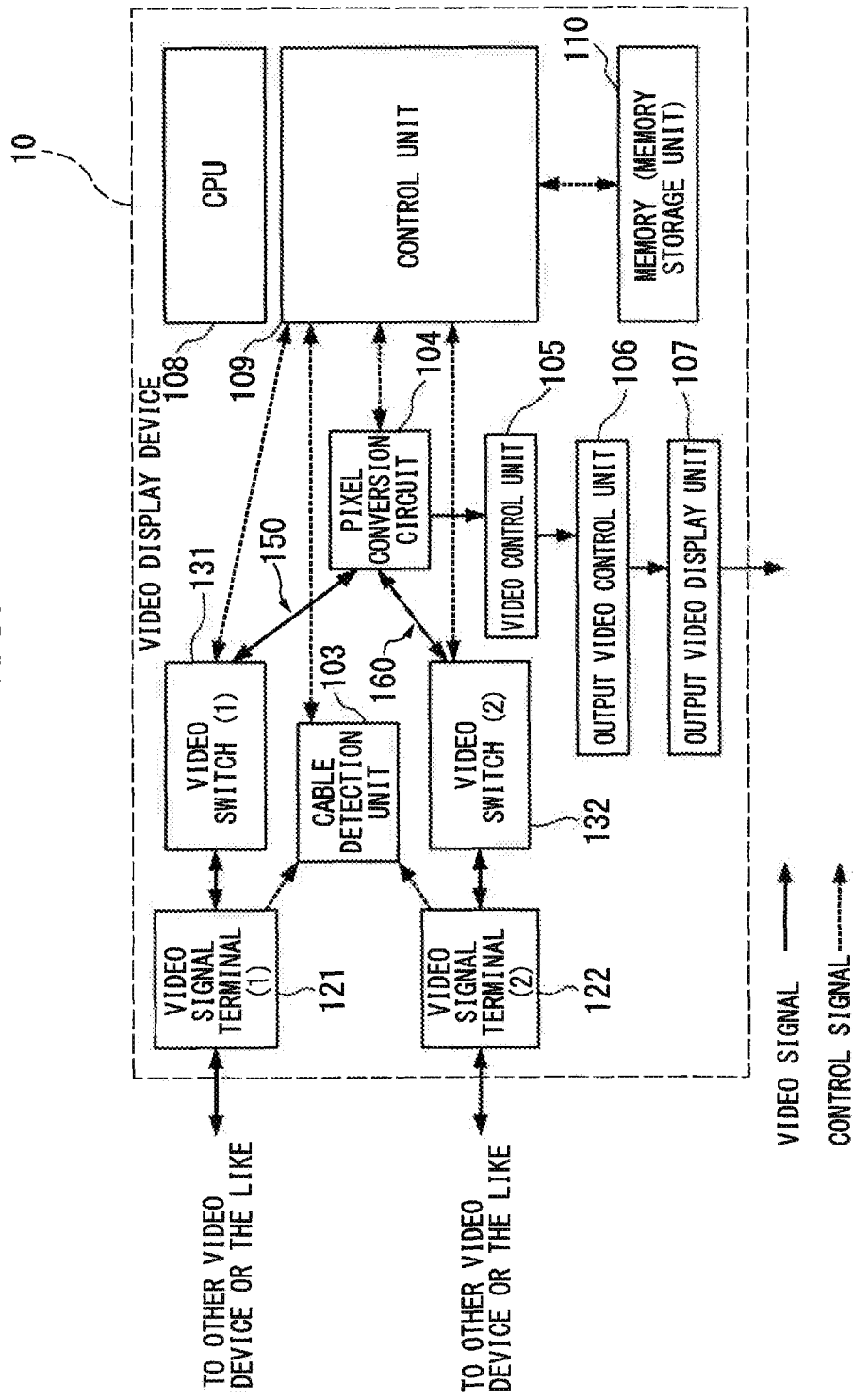
FIG. 1 is a block diagram showing a configuration example of a video display device according to a first exemplary embodiment of the present invention.

Hereinafter, a video display device according to a first exemplary embodiment of the present invention will be described, with reference to the drawings. FIG. 1 is a block diagram showing a configuration example of a video display device 10 according to the first exemplary embodiment of the present invention.

The video display device 10 shown in FIG. 1 includes a video signal terminal (1) 121, a video signal terminal (2) 122, a video switch (1) 131, a video switch (2) 132, a cable detection unit 103, and a pixel conversion circuit 104. The video display device 10 further includes a video control unit 105, an output video control unit 106, an output video display unit 107, a CPU (central processing unit) 108, a control unit 109, and a memory 110. In FIG. 1, each solid arrow indicates a flow of a video signal, and each broken arrow indicates a flow of a control signal for controlling each unit in the video display device 10 (the same applies in FIG. 6 and FIG. 10). Examples of the video signal include an image signal, an audio signal, and a control signal related to a video signal.

The video signal terminal (1) 121 is a connector for detachably connecting a connector of a predetermined video signal cable for inputting and/or outputting video signals. The video signal terminal (1) 121 has a plurality of predetermined pins. For example, the video signal terminal (1) 121 is a receptacle, and the connector of the video signal cable is a plug. The video signal terminal (1) 121 can also be used for inputting and/or outputting video signals.

The video signal terminal (2) 122 is a connector for detachably connecting a connector of a predetermined video signal cable for inputting and/or outputting video signals. The video signal terminal (2) 122 is a connector having the same shape as that of the video signal terminal (1) 121. The video signal terminal (2) 122 has a plurality of predetermined pins. For example, the video signal terminal (2) 122 is a receptacle, and the connector of the video signal cable is a plug. The video signal terminal (2) 122 can also be used for inputting and/or outputting video signals.

Figure 2:
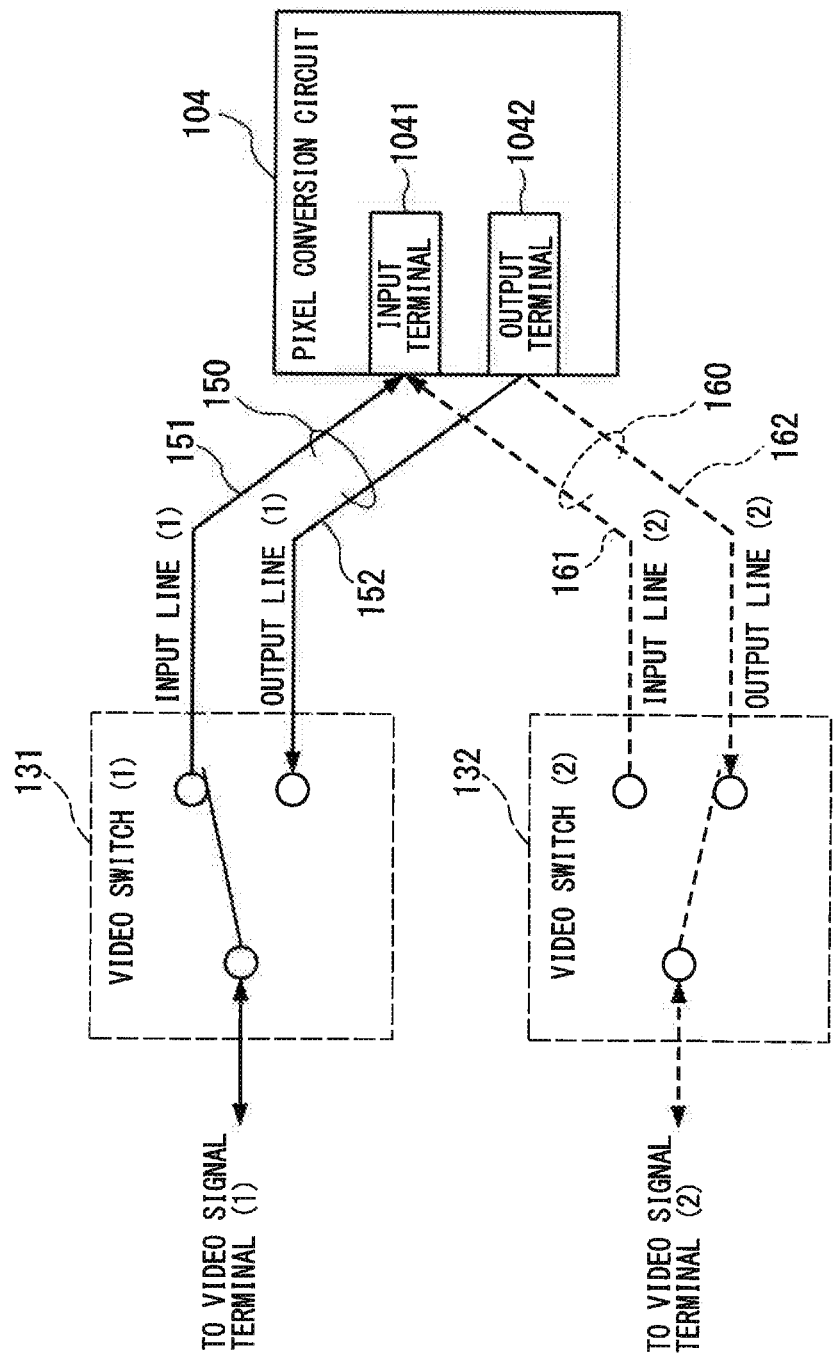
FIG. 2 is a schematic diagram for describing a configuration example of a video switch (1) 131 and a video switch (2) 132 shown in FIG. 1.

Next, a configuration example of the video switch (1) 131 and the video switch (2) 132 is described, with reference to FIG. 2. FIG. 2 is a schematic diagram for describing the configuration example of the video switch (1) 131 and the video switch (2) 132. The same constituents in FIG. 1 and FIG. 2 are denoted by the same reference symbols.

The video switch (1) 131 selectively connects the video signal terminal (1) 121 to either an input terminal 1041 or an output terminal 1042 of the pixel conversion circuit 104 via an input/output line 150. Switching of the connection of the video switch (1) 131 is controlled by the control unit 109. The video switch (1) 131 has, for example, a plurality of switches for switching the same number of wirings as the plurality in pins of the video signal terminal (1) 121. The input/output line 150 has an input line (1) 151 and an output line (1) 152 each having the same number of wirings as the plurality of switches in the video switch (1) 131. The plurality of wirings of the input line (1) 151 are connected to the input terminal 1041. The plurality of wirings of the output line (1) 152 are connected to the output terminal 1042.

The video switch (2) 132 has the same configuration as that of the video switch (1) 131. That is to say, the video switch (2) 132 selectively connects the video signal terminal (2) 122 to either the input terminal 1041 or the output terminal 1042 of the pixel conversion circuit 104 via an input/output line 160. Switching of the connection of the video switch (2) 132 is controlled by the control unit 109. The video switch (2) 132 has, for example, a plurality of switches for switching the same number of wirings as the plurality of pins of the video signal terminal (2) 122. The input/output line 160 has an input line (2) 161 and an output line (2) 162 each having the same number of wirings as the plurality of switches in the video switch (2) 132. The plurality of wirings of the input line (2) 161 are connected to the input terminal 1041. The plurality of wirings of the output line (2) 162 are connected to the output terminal 1042.

On the other hand, the cable detection unit 103 shown in FIG. 1 detects whether or not a video signal cable is connected to the video signal terminal (1) 121 and the video signal terminal (2) 122, and outputs a detection result to the control unit 109. For example, the cable detection unit 103 detects a resistance value, a voltage, a capacitance, and so forth of predetermined pins of the video signal terminal (1) 121 and the video signal terminal (2) 122 to thereby determine whether or not the video signal cable is connected. Alternatively, the cable detection unit 103 detects whether or not a video signal cable is connected on the basis of, for example, the ON/OFF state of a mechanical switch provided in the video signal terminal (1) 121 and the video signal terminal (2) 122. Or, the cable detection unit 103 detects whether or not a video signal cable is connected, using a proximity sensor for example.

The pixel conversion circuit 104 has the input terminal 1041 and the output terminal 1042 shown in FIG. 2. The pixel conversion circuit 104 outputs a video signal input from the input terminal 1041, from the output terminal 1042 without converting the resolution and/or format thereof. Meanwhile, the pixel conversion circuit 104 converts the format and/or resolution of a video signal input to the input terminal 1041, and outputs the converted video signal to the video control unit 105 shown in FIG. 1. That is to say, the video signal input from the input terminal 1041 is distributed (copied) in the pixel conversion circuit 104, and one of the distributed video signals is output from the output terminal 1042 without being converted in resolution and/or format, and the other distributed video signal is converted in resolution and/or format to be output to the video control unit 105. The video signal output from the output terminal 1042 may be a video signal in which deterioration therein caused by transmission and so forth has been compensated, or may be a video signal which has been converted in resolution and/or format. Operation of the pixel conversion circuit 104 is controlled by the control unit 109.

The video control unit 105 performs image processing or the like on the video signal input from the pixel conversion circuit 104 on the basis of a predetermined setting, and outputs the image-processed video signal to the output video control unit 106. Operation of the video control unit 105 is controlled by the control unit 109.

The output video control unit 106 converts the video signal input from the video control unit 105 so as to comply with the format of the input signal of the output video display unit 107, and outputs it to the output video display unit 107. Moreover, for example, in the case where this video display device 10 is set to configure a multi-display system together with a plurality of other video display devices 10, the output video control unit 106 performs processing of extracting a display region assigned to this video display device 10, and processing of extracting a video signal in which an address assigned to this video display device in the multi-stream transport function is set.

The output video display unit 107 has, for example, a display screen or a projector, and displays a video image on the basis of the video signal input from the output video control unit 106 on the display screen, or projects the video image by means of the projector.

The CPU 108 executes, for example, a predetermined program stored in the memory 110, and controls each unit via the control unit 109. In the present exemplary embodiment, the CPU 108 controls the control unit 109 to thereby control each unit so that, among the video signal terminal (1) 121 and the video signal terminal (2) 122, the one with the video signal cable connected thereto first is set as an input terminal and the other is set as an output terminal.

The control unit 109 inputs or outputs a predetermined control signal to or from each unit according to an instruction from the CPU 108. The control unit 109, for example, receives an input of cable detection results of the cable detection unit 103 at each of the video signal terminal (1) 121 and the video signal terminal (2) 122, and controls terminal settings of the pixel conversion circuit 104.

The CPU 108 and the control unit 109 can be integrally configured as, for example, a microcomputer or the like.

The memory 110 stores, for example, a program executed by the CPU 108 and predetermined information such as information of input and output settings at the video signal terminal (1) 121 and the video signal terminal (2) 122.

Figure 3:
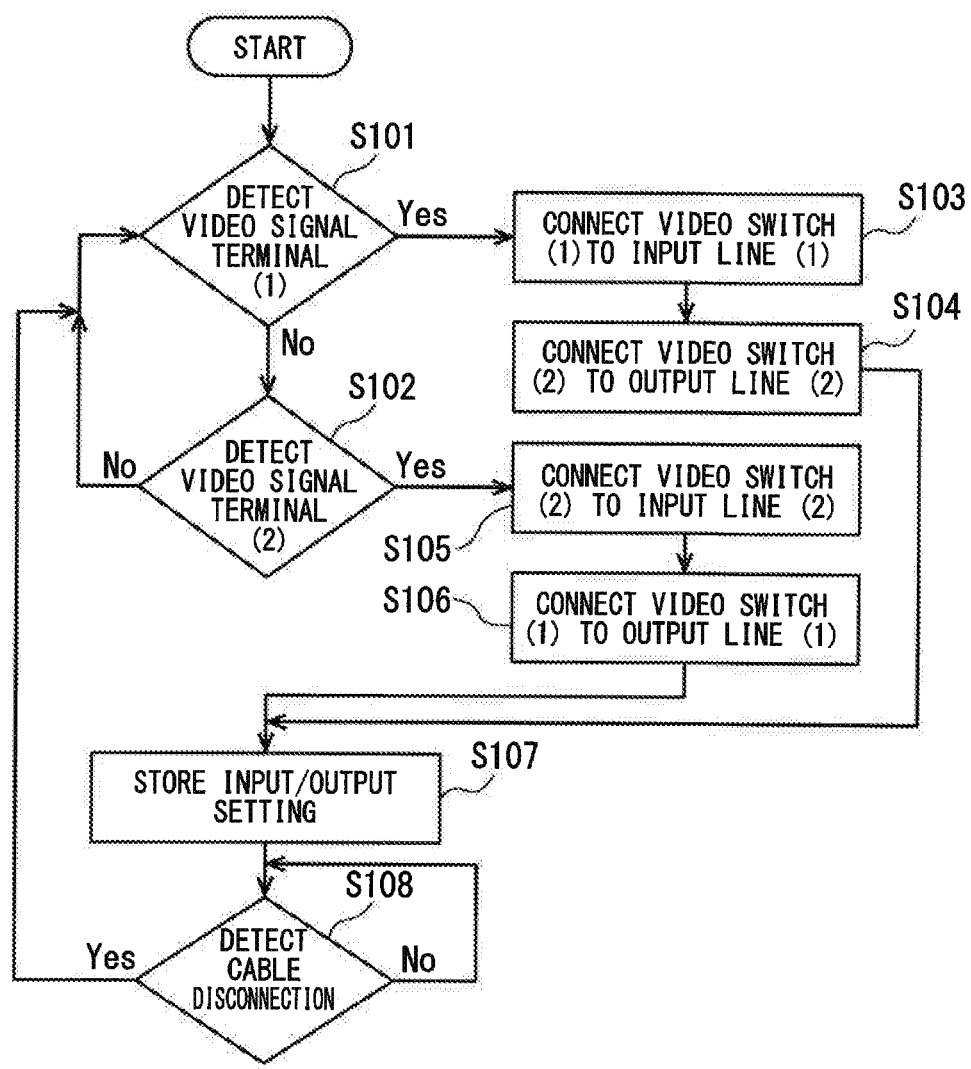
FIG. 3 is a flowchart showing an operation example of the video display device 10 shown in FIG. 1.
Figure 4:
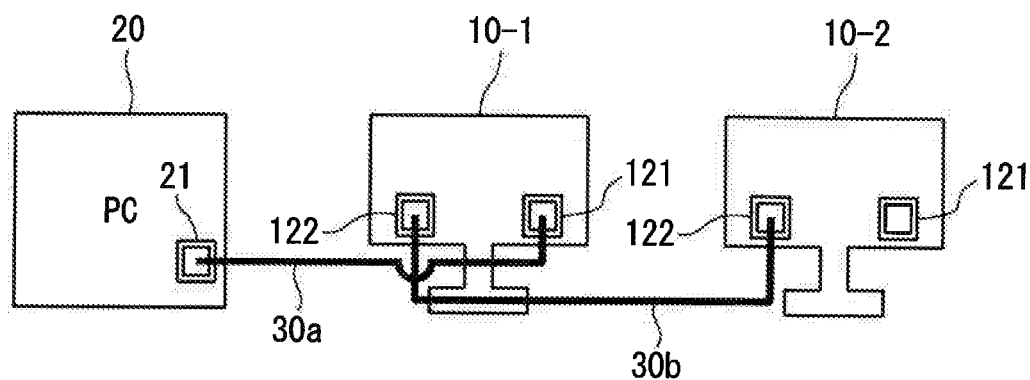
FIG. 4 is a schematic diagram showing a connection example of the video display device 10 shown in FIG. 1.

Next, with reference to FIG. 1, FIG. 2, FIG. 3, and FIG. 4, there is described an example of an operation at a time of setting input/output to the video signal terminal (1) 121 and the video signal terminal (2) 122 in the video display device 10 shown in FIG. 1. FIG. 3 is a flowchart showing the example of the operation at the time of setting input/output to the video signal terminal (1) 121 and the video signal terminal (2) 122 in the video display device 10. FIG. 4 is a schematic diagram showing an example of connection between a PC (personal computer) 20 serving as a video signal playback device and two video display devices 10 (shown as video display devices 10-1 and 10-2 in FIG. 4). In the example shown in FIG. 4, a video signal output from the PC 20 is input to the video display device 10-1, the video signal output from the video display device 10-1 is input to the video display device 10-2, and the video signal output from the PC 20 is displayed on the video display device 10-1 and on the video display device 10-2.

The process shown in FIG. 3 is performed, for example, when the operator instructs the video display device 10 to execute the processing of setting input/output of a terminal, when the CPU 108 is activated, or when the input/output setting information of each terminal is not stored in the memory 110. In this operation example, first, as shown in FIG. 4, the operator connects a video signal cable 30a to a connector 21 of the PC 20, and connects the other end thereof to the video signal terminal (1) 121 of the video display device 10-1. In such a case, the cable detection unit 103 of the video display device 10-1 detects whether or not the video signal cable 30a is connected to the video signal terminal (1) 121 (Step S101). Upon detecting the video signal cable 30a being connected to the video signal terminal (1) 121 ("YES" in Step S101), the control unit 109 controls the video switch (1) 131 to connect the video signal terminal (1) 121 with the input line (1) 151, and connect the video signal terminal (1) 121 with the input terminal 1041 of the pixel conversion circuit 104 (Step S103). Then, the control unit 109 controls the video switch (2) 132 to connect the video signal terminal (2) 122 with the output line (2) 162 and connect the video signal terminal (2) 122 with the output terminal 1042 of the pixel conversion circuit 104 (Step S104). As a result, the video signal terminal (1) 121 of the video display device 10-1 is automatically determined to be an input terminal, and the video signal terminal (2) 122 is automatically determined to be an output terminal. The control unit 109 stores the determined input/output setting in the memory 110 (Step S107), and thereafter operates according to the setting until the cable is disconnected (until "YES" is yielded in Step S108). When the cable is disconnected (in the case of "YES" in Step S108), the control unit 109 performs the processing from the start.

As shown in FIG. 4, the operator connects a video signal cable 30b to the video signal terminal (2) 122 of the video display device 10-1, and connects the other end thereof to the video signal terminal (2) 122 of the video display device 10-2. In such a case, the control unit 109 of the video display device 10-2 operates as follows. That is to say, upon the cable detection unit 103 of the video display device 10-2 detecting the video signal cable being connected to the video signal terminal (2) 122 ("YES" in Step S102), the control unit 109 controls the video switch (2) 132 to connect the video signal terminal (2) 122 with the input line (2) 161, and connect the video signal terminal (2) 122 with the input terminal 1041 of the pixel conversion circuit 104 (Step S105). Then, the control unit 109 controls the video switch (1) 131 to connect the video signal terminal (1) 121 with the output line (1) 152 and connect the video signal terminal (1) 121 with the output terminal 1042 of the pixel conversion circuit 104 (Step S106). As a result, the video signal terminal (1) 121 of the video display device 10-2 is automatically determined to be an output terminal, and the video signal terminal (2) 122 is automatically determined to be an input terminal.

As described above, in the present embodiment, the video display device 10 operates in a manner such that the video signal terminal in which the video signal cable is detected first serves as an input terminal, and the other serves as an output terminal. Therefore, the operator can connect the video signal cable without having to pay particular attention to input and output of the terminal of the video device.

In the video display device 10, in the case, for example, where the processing shown in FIG. 3 is executed according to the instruction of the operator, then when the processing shown in FIG. 3 is not being executed, the control unit 109 may control the video switch (1) 131 and the video switch (2) 132, if setting information related to input/output of the connections of the video switch (1) 131 and the video switch (2) 132 are stored in the memory 110, according to the stored setting information.

Second Exemplary Embodiment

Figure 5:
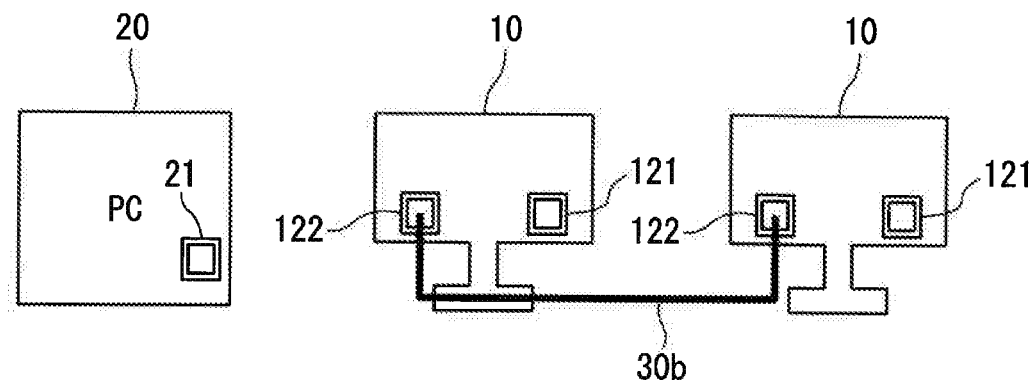
FIG. 5 is a schematic diagram showing another connection example of video display devices 10-1 and 10-2 according to the first exemplary embodiment shown in FIG. 4.

Hereinafter, a video display device according to a second exemplary embodiment of the present invention will be described. First, a premise of the present exemplary embodiment will be described, with reference to FIG. 4 and FIG. 5. FIG. 5 is a schematic diagram showing another connection example of the video display devices 10-1 and 10-2 according to the first exemplary embodiment shown in FIG. 4.

The connection example shown in FIG. 4 was an example where, first, the connector 21 of the PC 20 and the video signal terminal (1) 121 of the video display device 10-1 are connected by the video signal cable 30a, and then the video signal terminal (2) 122 of the video display device 10-1 and the video signal terminal (2) 122 of the video display device 10-2 are connected by the video signal cable 30b. In such a case, in the video display device 10-1, the video signal cable 30a on the input side is connected first, and then the video signal cable 30b on the output side is connected. On the other hand, in the video display device 10-2, the video signal cable 30b on the input side is connected first. Therefore, input/output can be set correctly by setting the video signal terminal to which the video cable is connected first as the input side.

On the other hand, the connection example shown in FIG. 5 is a case where, first, the video signal terminal (2) 122 of the video display device 10-1 and the video signal terminal (2) 122 of the video display device 10-2 are connected by the video signal cable 30*b*. That is to say, in the example shown in FIG. 4, the video signal cables are connected from the PC 20 to the video display devices 10-1 and 10-2 in the order of connection. On the other hand, as shown in FIG. 5, if the video signal cables are connected from the video display devices 10-1 and 10-2 along the way, the video signal terminals (2) 122 to which the video signal cable 30*b* is connected are both set as input terminals in the two video display devices 10-1 and 10-2. This problem cannot be addressed in the first exemplary embodiment. In the second exemplary embodiment there is provided a configuration which addresses the problem.

Figure 6:
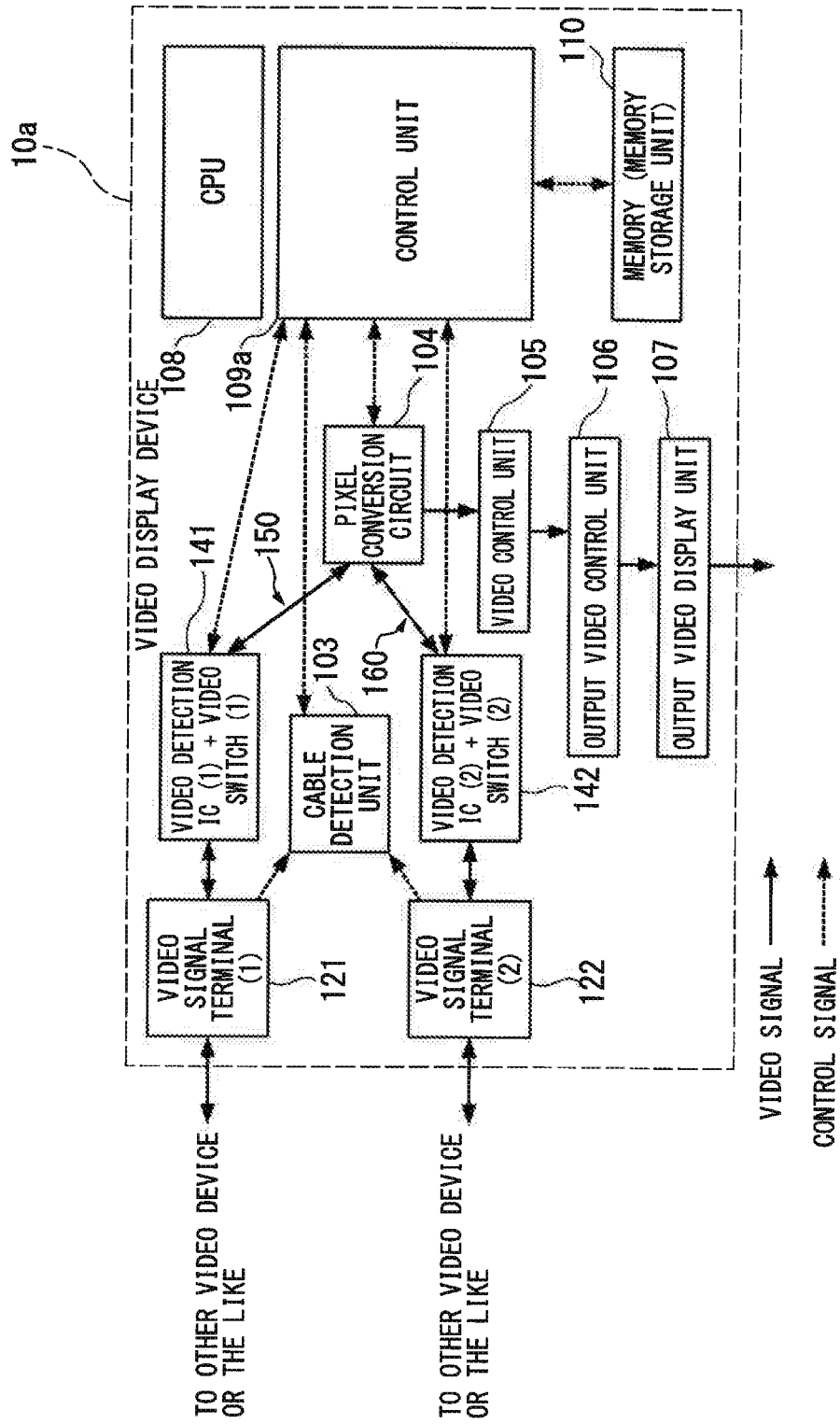
FIG. 6 is a block diagram showing a configuration example of a video display device 10a according to a second exemplary embodiment of the present invention.

FIG. 6 is a block diagram showing a configuration example of a video display device 10*a* according to the second exemplary embodiment of the present invention. In FIG. 6, the same or corresponding constituents as those in the video display device 10 according to the first exemplary embodiment shown in FIG. 1 are given the same reference symbols, and descriptions thereof are omitted where appropriate. The video display device 10*a* shown in FIG. 6 differs from the video display device 10 shown in FIG. 1 in the following points. That is to say, the video switch (1) 131 shown in FIG. 1 is replaced with a video detection IC (integrated circuit) (1)+video switch (1) 141, and the video switch (2) 132 shown in FIG. 1 is also replaced with a video detection IC (2)+video switch (2) 142. Moreover, a part of the program executed by the CPU 108 is changed so as to support the operation of a control unit 109*a* described later. The control unit 109*a*, which is a constituent corresponding to the control unit 109 shown in FIG. 1, has a function of inputting control signals which indicate results of detecting video signal outputs from the video detection IC (1)+video switch (1) 141 and the video detection IC (2)+video switch (2) 142.

In addition to the same video signal switching function as that of the video switch (1) 131 shown in FIG. 1 and FIG. 2, the video detection IC (1)+video switch (1) 141 includes a function of detecting, by means of the video detection IC (1), whether or not a predetermined video signal is input from the video signal terminal (1) 121. Moreover, in addition to the same video signal switching function as that of the video switch (2) 132 shown in FIG. 1 and FIG. 2, the video detection IC (2)+video switch (2) 142 includes a function of detecting, by means of the video detection IC (2), whether or not a predetermined video signal is input from the video signal terminal (2) 122.

In the following description related the second exemplary embodiment, when FIG. 2 is referred to, reference symbol "131" shown in FIG. 2 is replaced with "141", and reference symbol "132" shown in FIG. 2 is replaced with "142".

That is to say, the video detection IC (1)+video switch (1) 141 selectively connects the video signal terminal (1) 121 with either the input line (1) 151 or the output line (1) 152 according to the control of the control unit 109*a*. Moreover, the video detection IC (1)+video switch (1) 141 detects whether or not a predetermined video signal is input to the video signal terminal (1) 121 and outputs a control signal which indicates the detection result to the control unit 109*a*. Furthermore, the video detection IC (2)+video switch (2) 142 selectively connects the video signal terminal (2) 122 with either the input line (2) 161 or the output line (2) 162 according to the control of the control unit 109*a*. Moreover, the video detection IC (2)+video switch (2) 142 detects whether or not a predetermined video signal is input to the video signal terminal (2) 122 and outputs a control signal which indicates the detection result to the control unit 109*a*.

Figure 7:
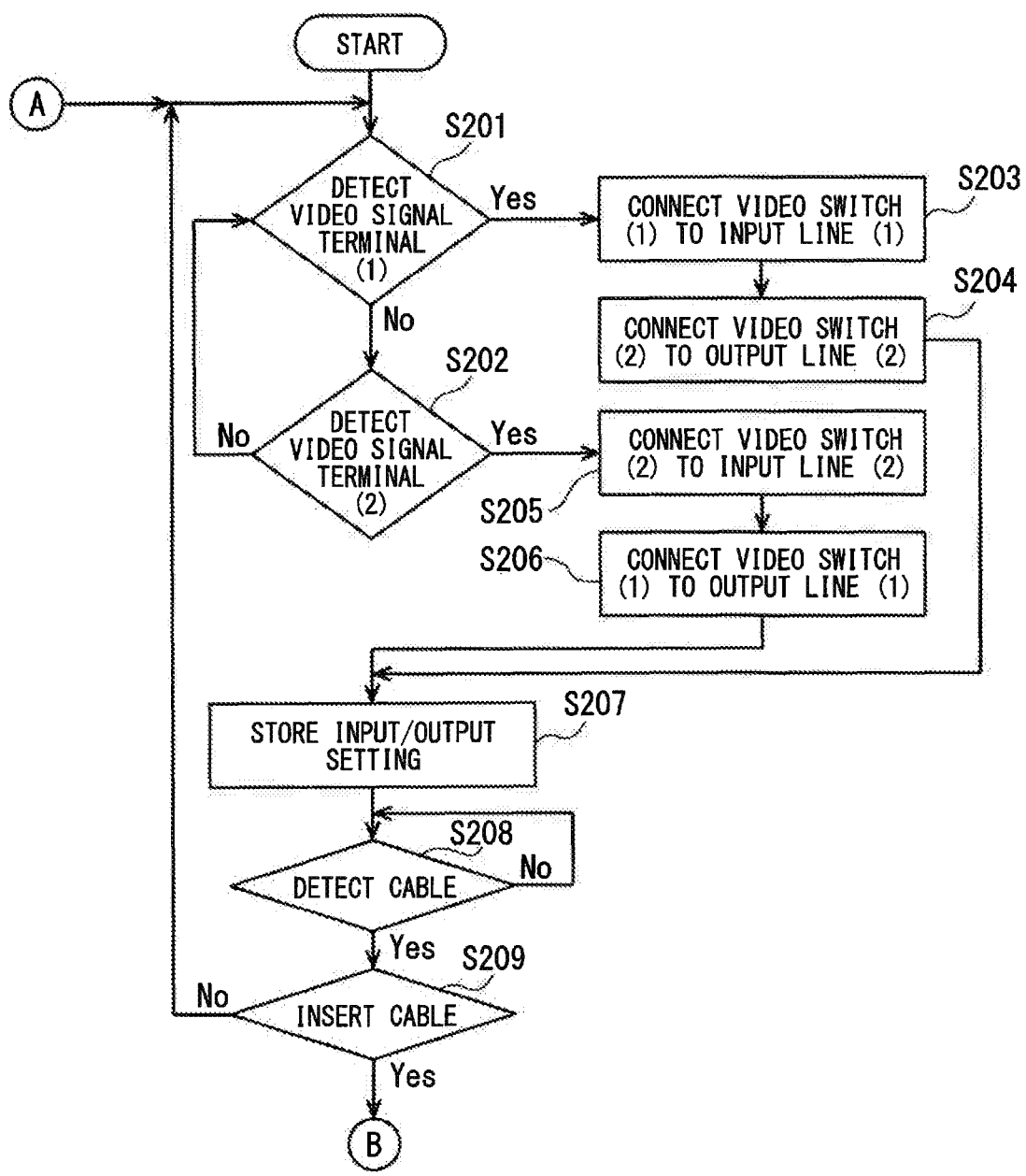
FIG. 7 is a flowchart showing an operation example of the video display device 10a shown in FIG. 6.
Figure 8:
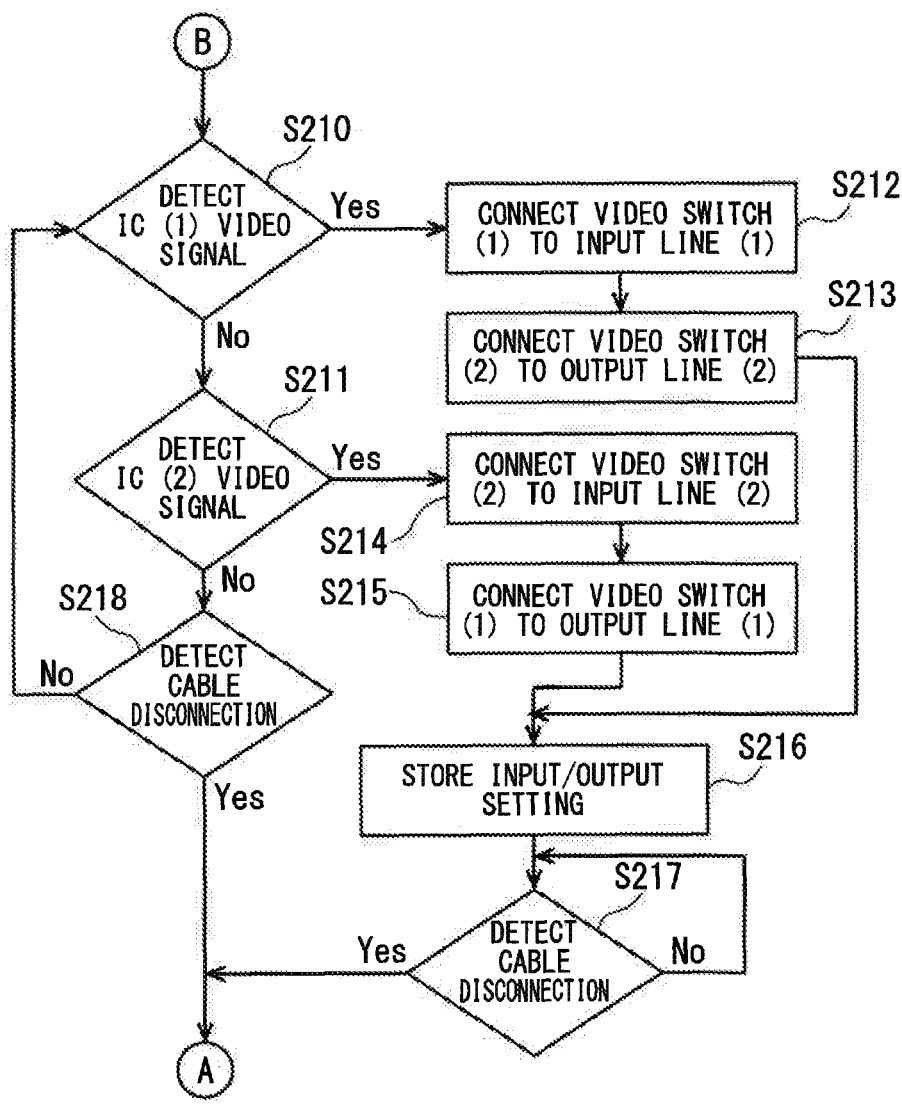
FIG. 8 is a flowchart showing an operation example of the video display device 10a shown in FIG. 6.

Next, with reference to FIG. 6, FIG. 2, FIG. 7, and FIG. 8, there is described an example of an operation at a time of setting input/output to the video signal terminal (1) 121 and the video signal terminal (2) 122 in the video display device 10*a* shown in FIG. 6. FIG. 7 and FIG. 8 are flowcharts showing an example of the operation at the time of setting input/output to the video signal terminal (1) 121 and the video signal terminal (2) 122 in the video display device 10*a*. The processing shown in FIG. 7 and the processing shown in FIG. 8 are linked via connectors A and connectors B. In FIG. 7 and FIG. 8, the video detection IC (1)+video switch (1) 141 is denoted as "IC (1)" when indicating an operation corresponding to the video signal detection function, and is denoted as "video switch (1)" when indicating an operation corresponding to the video signal switching function. Similarly, in FIG. 7 and FIG. 8, the video detection IC (2)+video switch (2) 142 is denoted as "IC (2)" when indicating an operation corresponding to the video signal detection function, and is denoted as "video switch (2)" when indicating an operation corresponding to the video signal switching function.

The processing shown in FIG. 7 and FIG. 8 is performed, for example, when the operator instructs the video display device 10*a* to execute the process of setting input/output of a terminal, when the CPU 108 is activated, or when the input/output setting information of each terminal is not stored in the memory 110. In the video display device 10*a*, first, the process stands by until the cable detection unit 103 detects a video signal cable as being connected to the video signal terminal (1) 121 or the video signal terminal (2) 122 ("NO" in Step S201, and "NO" is repeated in Step S202).

If the cable detection unit 103 detects a video signal cable as being connected to the video signal terminal (1) 121 ("YES" in Step S201), the control unit 109*a* connects the video detection IC (1)+video switch (1) 141 with the input line (1) 151 (Step S203), and connects the video detection IC (2)+video switch (2) 142 with the output line (2) 162 (Step S204).

On the other hand, if the cable detection unit 103 detects the video signal cable as being connected to the video signal terminal (2) 122 ("YES" in Step S202), the control unit 109*a* connects the video detection IC (2)+video switch (2) 142 with the input line (2) 161 (Step S205), and connects the video detection IC (1)+video switch (1) 141 with the output line (1) 152 (Step S206).

The control unit 109*a* stores the settings of Step S203 to Step S206 in the memory 110 (Step S207), whereby the video display device 10*a* operates as a single monitor in which the input terminal has been determined. At this point, the video signal cable is not connected to the output side terminal of the video display device 10*a*.

Next, the control unit 109*a* repeatedly checks detection results of the cable detection unit 103 until a change occurs in the control signal which indicates a detection result of the cable detection unit 103 ("NO" is repeated in Step S208).

If a change occurs in the control signal which indicates a detection result of the cable detection unit 103 ("YES" in Step S208), then when the video signal cable is disconnected, the control unit 109*a* treats the video signal cable connected to the video display device 10*a* as being absent, and returns the process to the start thereof ("NO" in Step S209).

On the other hand, when the video signal cable is inserted ("YES" in Step S209), the control unit 109*a* performs detection of a video signal while the terminal to which the video signal cable is subsequently connected stands by as the output terminal (Step S210 and Step S211).

If the video detection IC (1)+video switch (1) 141 detects a video signal first ("YES" in Step S210), the control unit 109a connects the video detection IC (1)+video switch (1) 141 with the input line (1) 151 (Step S212), and connects the video detection IC (2)+video switch (2) 142 with the output line (2) 162 (Step S213).

On the other hand, if the video detection IC (2)+video switch (2) 142 detects a video signal first ("YES" in Step S211), the control unit 109a connects the video detection IC (2)+video switch (2) 142 with the input line (2) 161 (Step S214), and connects the video detection IC (1)+video switch (1) 141 with the output line (1) 152 (Step S215).

When input/output terminals are conclusively determined, the control unit 109a stores the settings of Step S212 to Step S215 in the memory 110 (Step S216), whereby the video display device 10a operates as a monitor in which the input terminal and the output terminal have been determined. In the case where the input settings are not to be saved, input/output terminals are changed constantly according to the input signals.

If the video signal cable is disconnected during the detection of the video signal or after determining the input/output terminal ("YES" in Step S217 or "YES" in Step S218), the process returns to the start thereof, and the control unit 109a determines whether the terminal from which the video signal cable has been disconnected is the video signal terminal (1) 121 or the video signal terminal (2) 122 (Step S201 and Step S202), and conclusively determines the input terminal again in the process described above (Step S203 to Step S207), resulting in the video display device 10a operating as a single monitor.

According to the second exemplary embodiment, as with the case shown in FIG. 5, even when two of the video display devices 10a are connected by the video signal cable 30b in the state where the PC 20 is not connected, then by connecting either one of the video display devices 10a to the PC 20, the input/output terminals for video signals can be automatically determined, and the video image can be displayed on the two video display devices 10a.

In the video display device 10a, in the case, for example, where the processing shown in FIG. 7 and FIG. 8 is executed according to the instruction of the operator, then when the processing shown in FIG. 7 and FIG. 8 is not being executed, the control unit 109a may control the video detection IC (1)+video switch (1) 141 and the video detection IC (2)+video switch (2) 142, if the setting information related to input/output of the connections of the video detection IC (1)+video switch (1) 141 and the video detection IC (2)+video switch (2) 142 is stored in the memory 110, according to the stored setting information.

Figure 9:
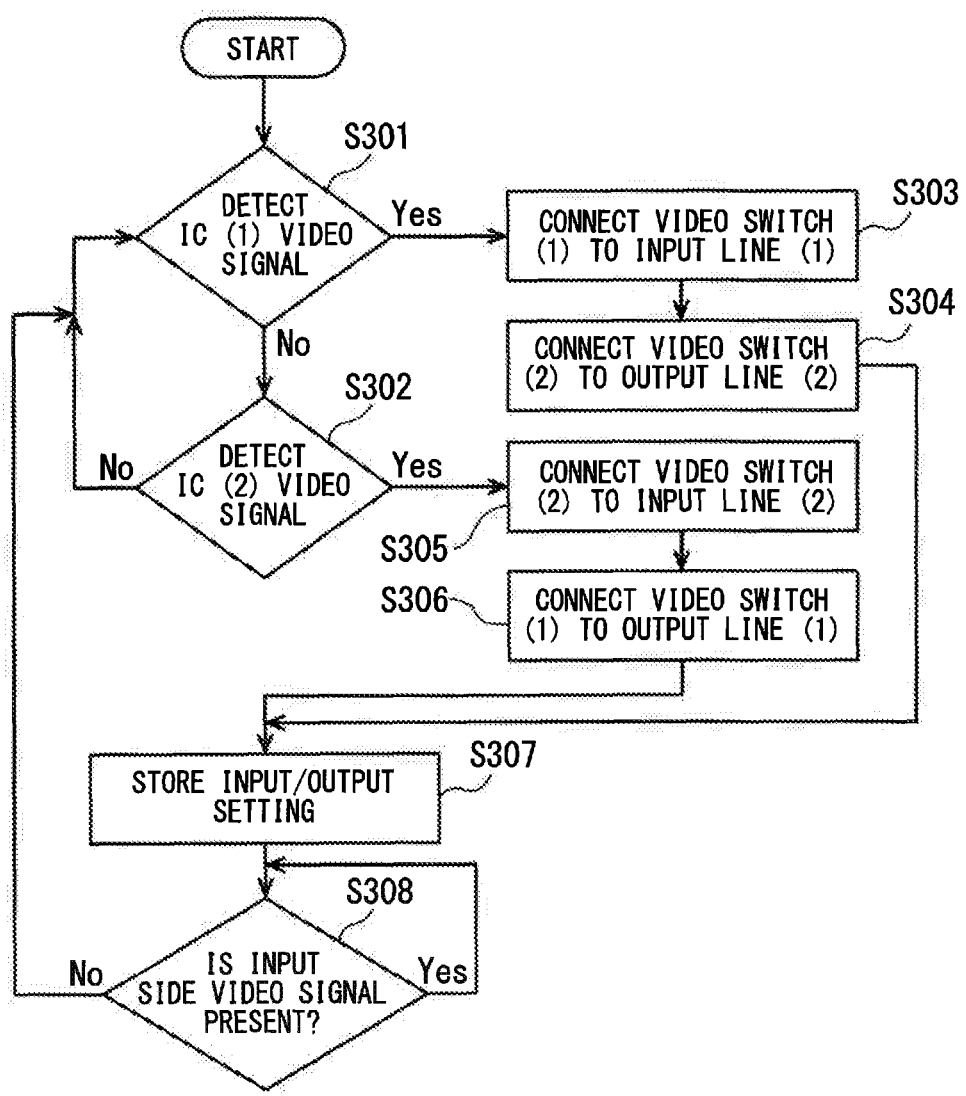
FIG. 9 is a flowchart showing another operation example of the video display device 10a shown in FIG. 6.

Next, another operation example of the second exemplary embodiment will be described with reference to FIG. 9. FIG. 9 is a flowchart showing another example of the operation at the time of setting input/output to the video signal terminal (1) 121 and the video signal terminal (2) 122 in the video display device 10a shown in FIG. 6. As with FIG. 7 and FIG. 8, also in FIG. 9, the video detection IC (1)+video switch (1) 141 is denoted as "IC (1)" when indicating an operation corresponding to the video signal detection function, and is denoted as "video switch (1)" when indicating an operation corresponding to the video signal switching function. Similarly, in FIG. 9, the video detection IC (2)+video switch (2) 142 is denoted as "IC (2)" when indicating an operation corresponding to the video signal detection function, and is denoted as "video switch (2)" when indicating an operation corresponding to the video signal switching function. The operation example shown in FIG. 9 is an example of a case where the control unit 109a does not use cable detection results of the cable detection unit 103. Therefore, when the operation example shown in FIG. 9 is used, the cable detection unit 103 shown in FIG. 6 can be omitted.

The processing shown in FIG. 9 is performed, for example, when the operator instructs the video display device 10a to execute the process of setting input/output of the terminals, when the CPU 108 is activated, or when the input/output setting information of each terminal is not stored in the memory 110. In such a case, as with the case shown in FIG. 4, in the video display device 10a, the video signal cable 30a is connected to the video signal terminal (1) 121 and the other video signal cable 30b is connected to the video signal terminal (2) 122.

Here, when the video signal cable 30a connected to the video signal terminal (1) 121 is connected to the PC 20 and a video signal is input from the PC 20, the video detection IC (1)+video switch (1) 141 detects the video signal ("YES" in Step S301), and the control unit 109a controls the video detection IC (1)+video switch (1) 141 to connect the video signal terminal (1) 121 with the input line (1) 151, and connect the video signal terminal (1) 121 with the input terminal 1041 of the pixel conversion circuit 104 (Step S303). Then, the control unit 109a controls the video detection IC (2)+video switch (2) 142 to connect the video signal terminal (2) 122 with the output line (2) 162 and connect the video signal terminal (2) 122 with the output terminal 1042 of the pixel conversion circuit 104 (Step S304). As a result, input and output of the video signal terminals are automatically determined. Next, the control unit 109a stores the determined input/output settings in the memory 110 (Step S307). Accordingly, thereafter, the video display device 10a operates according to the settings saved in Step S307 until the input of signals stops (until "NO" is yielded in Step S308). When the input of signals stops ("NO" in Step S308), the control unit 109a performs the processing from the start.

In the processing of determining whether or not "an input side video signal is present" performed by the control unit 109a in Step S308, if the video detection IC (1)+video switch (1) 141 side is the input side, the video signal on the video detection IC (1)+video switch (1) side is monitored, and the input/output setting is maintained as long as the signal is present. If the video signals stop, signal detection is performed again by means of the video detection IC (1)+video switch (1) 141 and the video detection IC (2)+video switch (2)+142. The processing is also performed in a similar manner when the video detection IC (2)+video switch (2) 142 is the input side.

On the other hand, when the video signal cable connected to the video signal terminal (2) 122 is connected to the PC 20 and the PC 20 outputs a video signal, the control unit 109a operates as follows. That is to say, since the video detection IC (2)+video switch (2) 142 detects a video signal ("YES" in Step S302), the control unit 109a connects the video detection IC (2)+video switch (2) 142 with the input line (2) 161 (Step S305), and connects the video detection IC (1)+video switch (1) 141 with the output line (1) 152 (Step S306). As a result, input and output of the video signal terminals are automatically determined.

That is to say, in the example shown in FIG. 9, the control unit 109a operates in a manner such that the video signal terminal in which a video signal is detected first serves as an input terminal while the rest serves as an output terminal. As a result, even without the cable detection unit 103, it is possible to automatically determine the input terminal and the output terminal.

As described above, in the first exemplary embodiment of the present invention, the video switch is attached to input and output terminals, and one to which the video signal cable is connected first is set as an input terminal, and the latter is set as an output terminal. Therefore, according to the first exemplary embodiment of the present invention, the operator can connect the video signal cable without having to pay particular attention to input and output of the terminals.

Moreover, in the second exemplary embodiment of the present invention, the video signal detection IC and the video switch are attached to the input and output terminals, and one which detects a video signal first is set as an input terminal, and the latter is set as an output terminal. Therefore, according to the second exemplary embodiment of the present invention, the operator can establish a daisy-chained connection between several of the video display devices 10*a* without having to pay particular attention to input and output of the terminals.

The exemplary embodiments of the present invention are not limited to video display devices such as monitors, and can also be applied to, for example, video devices in general. Here, in the present application, a video device is a device which processes video signals, and is a device which inputs and/or outputs video signals. Further, the processing of video signals includes a video signal display process, a video signal reproduction process, a video signal recording process, a video signal conversion process, a video signal transfer process, and a combination of these processes.

In the exemplary embodiments described above, video display devices each having two video signal terminals was taken as an example. However, the invention is not limited to this, and the video display device may have three or more video signal terminals. In such a case, for example, the terminal in which connection of the video signal cable or an input of a video signal is detected first can be set as an input terminal, and the remaining terminals can be set as output terminals.

Furthermore, the exemplary embodiments of the present invention can be applied to multi-display-device displaying using a plurality of video devices. Also, the exemplary embodiments of the present invention can be applied to a display system using the multi/single stream transport functions. The video signal terminal (1) 121 and the video signal terminal (2) 122 can support, for example, DisplayPort (a trademark and/or registered trademark in the United States and other countries), which is one of video signal interface standards.

Figure 10:
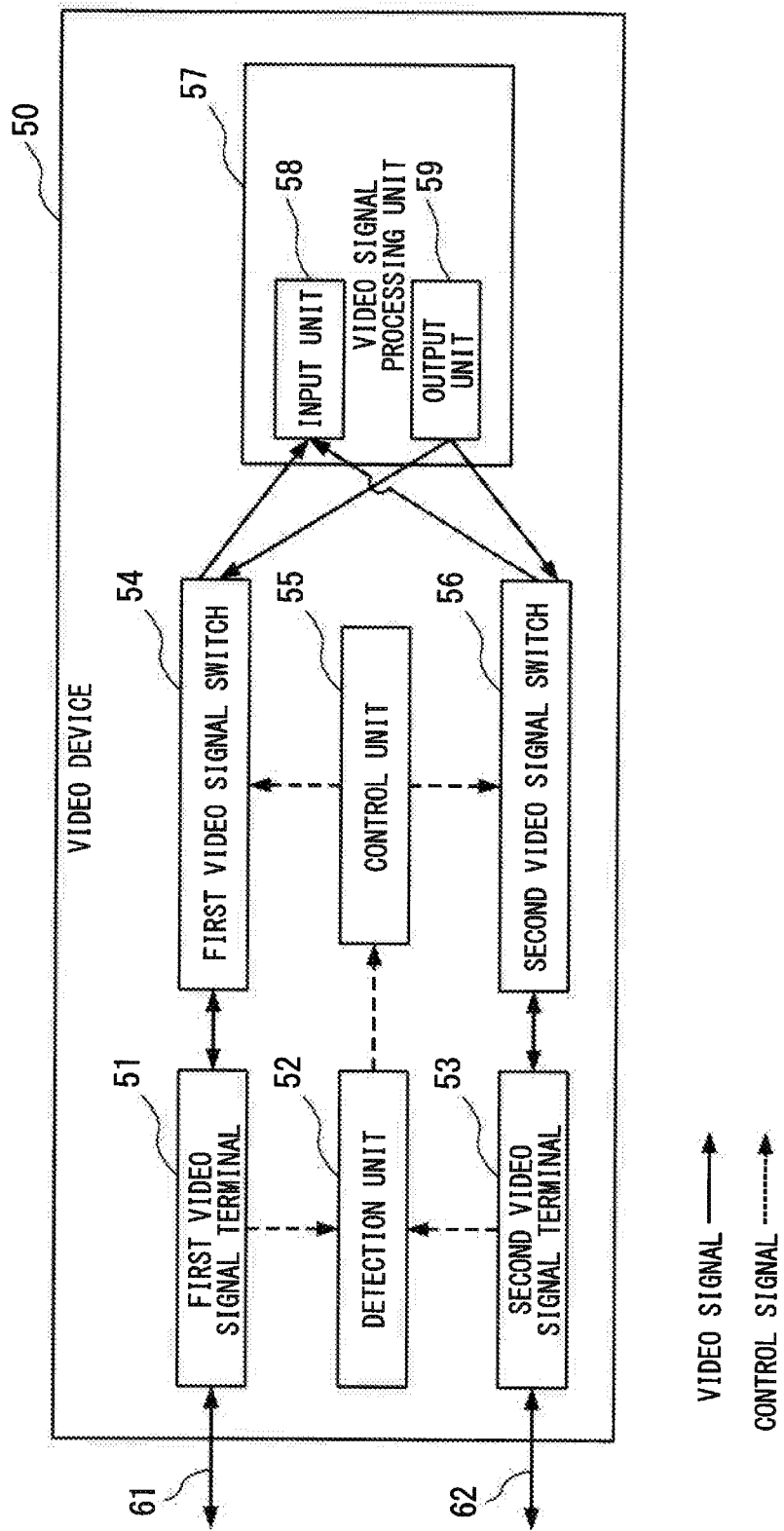
FIG. 10 is a block diagram showing a minimum configuration example of the exemplary embodiments of the present invention.

Next, a minimum configuration example of the exemplary embodiments will be described, with reference to FIG. 10. FIG. 10 is a block diagram showing the minimum configuration example of the exemplary embodiments of the present invention. A video device 50 of the present exemplary embodiments shown in FIG. 10 includes a first video signal terminal 51, a detection unit 52, a second video signal terminal 53, a first video signal switch 54, a control unit 55, a second video signal switch 56, and a video signal processing unit 57.

The video signal processing unit 57 has an input unit 58 and an output unit 59 for video signals, and performs a predetermined process on video signals input from the input unit 58, and outputs the processed video signals from the output unit 59. To the first video signal terminal 51, a video signal cable 61 for transmitting video signals is detachably connected. The second video signal terminal 53 is of the same shape as that of the first video signal terminal 51, and a video signal cable 62 is detachably connected thereto. Examples of the predetermined process performed on video signals include a video signal conversion process, a video signal transfer process, a video signal display process, a video signal reproduction process, a video signal recording process, and a combination of these processes.

The detection unit 52 detects a predetermined state in the first video signal terminal 51 and the second video signal terminal 53. The first video signal switch 54 connects the first video signal terminal 51 to either the input unit 58 or the output unit 59. The second video signal switch 56 connects the first video signal terminal 53 to either the input unit 58 or the output unit 59. The control unit 55 controls the connection state of the first video signal switch 54 and the connection state of the second video signal switch 56 according to detection results of the detection unit 52.

According to the present exemplary embodiment, the control unit 55 automatically sets, according to the detection result of the detection unit 52, one of the first video signal terminal 51 and the second video signal terminal 53 as an input terminal and the other as an output terminal. Therefore, the operator can connect a video signal cable to the video device without having to pay particular attention to input and output of the terminals.

The video device 50 may include a memory storage unit which stores setting information of the connection of the first video signal switch 54 and the second video signal switch 56. Moreover, the control unit 55 may control the connection state of the first video signal switch 54 and the connection state of the second video signal switch 56 according to detection results of the detection unit 52 or the setting information stored in the memory storage unit. According to this configuration, it is possible for example to change the input/output setting state only when the connection of the video signal cable is changed.

Furthermore, the detection unit 52 may detect, as the predetermined state, whether or not the video signal cable 61 or 62 is connected to the first video signal terminal 51 and the second video signal terminal 53. Moreover, the control unit 55 may control the connection state of the first video signal switch 54 and the connection state of the second video signal switch 56, so that one of the first video signal terminal 51 and the second video signal terminal 53 in which a connection of the video signal cable 61 or 62 has been detected first is connected to the input unit 58, and the other is connected to the output unit 59.

Furthermore, the detection unit 52 may detect, as the predetermined state, whether or not an input of a video signal is present to the first video signal terminal 51 and the second video signal terminal 53. Moreover, the control unit 55 may control the connection state of the first video signal switch 54 and the connection state of the second video signal switch 56, so that one of the first video signal terminal 51 and the second video signal terminal 53 in which a video signal input has been detected first is connected to the input unit 58, and the other is connected to the output unit 59.

Further, the video device 50 may include a display unit (which corresponds to the output video display unit 107 in FIG. 1 and FIG. 6) which displays a video image on the basis of the video signal input to the input unit 58 of the video signal processing unit 57.

The correspondence between each constituent shown in FIG. 10 and each constituent of the first exemplary embodiment or the second exemplary embodiment is as follows. The video device 50 corresponds to the video display device 10 shown in FIG. 1 and the video display device 10a shown in FIG. 6. The first video signal terminal 51 corresponds to the video signal terminal (1) 121 shown in FIG. 1 and FIG. 6. The detection unit 52 corresponds to the cable detection unit 103 shown in FIG. 1 and FIG. 6, the video detection IC (1)+video switch (1) 141 shown in FIG. 6 (video signal detection function), and the video detection IC (2)+video switch (2) 142 shown in FIG. 6 (video signal detection function). The second video signal terminal 53 corresponds to the video signal terminal (2) 122 shown in FIG. 1 and FIG. 6. The first video signal switch 54 corresponds to the video switch (1) 131 shown in FIG. 1, and the video detection IC (1)+video switch (1) 141 shown in FIG. 6 (video signal switching function). The control unit 55 corresponds to the combination of the CPU 108 and the control unit 109 shown in FIG. 1 (or the control unit 109) and the combination of the CPU 108 and the control unit 109a shown in FIG. 6 (or the control unit 109a). The second video signal switch 56 corresponds to the video switch (2) 132 shown in FIG. 1, and the video detection IC (2)+video switch (2) 142 shown in FIG. 6 (video signal switching function). The video signal processing unit 57 corresponds to the pixel conversion circuit 104 shown in FIG. 1 and FIG. 6. The input unit 58 corresponds to the input terminal 1041 shown in FIG. 2. The output unit 59 corresponds to the output terminal 1042 shown in FIG. 2.

As described above, the exemplary embodiments of the present invention have been described in detail with reference to the drawings. However, the specific configuration of the invention is not limited to these exemplary embodiments and includes designs and the like not departing from the gist of the present invention.

REFERENCE SIGNS LIST 10, 10a Video display device
50 Video device
51 First video signal terminal
52 Detection unit
53 Second video signal terminal
54 First video signal switch
55 Control unit
56 Second video signal switch
57 Video signal processing unit
58 Input unit
59 Output unit
103 Cable detection unit
104 Pixel conversion circuit
107 Output video display unit
108 CPU
109, 109a Control unit
121 Video signal terminal (1)
122 Video signal terminal (2)
131 Video switch (1)
132 Video switch (2)
141 Video detection IC (1)+video switch (1)
142 Video detection IC (2)+video switch (2)
1041 Input terminal
1042 Output terminal

The invention claimed is:

1. A video device, comprising:
a pixel conversion circuit including:
an input terminal configured to receive a video signal; and
an output terminal configured to output the video signal;
a first video signal terminal to which a first video signal cable for transmitting a first video signal is detachably connected;
a second video signal terminal to which a second video signal cable for transmitting a second video signal is detachably connected, the second video signal cable differing from the first video signal cable, and the second video signal terminal having a same shape as a shape of the first video signal terminal;
a detection sensor configured to sense a first connection of the first video signal cable to the first video signal terminal and a second connection of the second video signal cable to the second video signal terminal;
a first video signal switch configured to connect the first video signal terminal to either the input terminal or the output terminal;
a second video signal switch configured to connect the second video signal terminal to either the input terminal or the output terminal; and
a processor configured to, according to a sensing by the detection sensor:
control the first video signal switch to connect the first video signal terminal to one of the input terminal and the output terminal; and
control the second video signal switch to connect the second video signal terminal to another one of the input terminal and the output terminal,
wherein the processor is further configured to, based on the detection sensor sensing the first connection before the second connection:
control the first video signal switch to connect the first video signal terminal to the input terminal; and
control the second video signal switch to connect the second video signal terminal to the output terminal, and
wherein the processor is further configured to, based on the detection sensor sensing the second connection before the first connection:
control the second video signal switch to connect the second video signal terminal to the input terminal; and
control the first video signal switch to connect the first video signal terminal to the output terminal.

2. The video device according to claim 1, further comprising
a memory configured to store setting information regarding a connection relationship among the first video signal terminal, the second video signal terminal, the input terminal, and the output terminal,
wherein the processor is configured to control the first video signal switch and the second video signal switch to maintain the connection relationship until at least one of the first video signal cable and the second video signal cable is disconnected.

3. The video device according to claim 1, further comprising:
a display configured to output a video image on a basis of the video signal inputted to the input terminal of the pixel conversion circuit.

4. The video device according to claim 1, wherein, according to the sensing by the detection sensor, the first video signal switch only connects the first video signal terminal to the one of the input terminal and the output terminal.

5. The video device according to claim 4, wherein, according to the sensing by the detection sensor, the second video signal switch only connects the second video signal terminal to the other one of the input terminal and the output terminal.

6. A video device, comprising:
a pixel conversion circuit including:
an input terminal configured to receive a video signal; and
an output terminal configured to output the video signal;
a first video signal terminal to which a first video signal cable for transmitting a first video signal is detachably connected;
a second video signal terminal to which a second video signal cable for transmitting a second video signal is detachably connected, the second video signal cable differing from the first video signal cable, and the second video signal terminal having a same shape as a shape of the first video signal terminal;
a detection sensor configured to sense a first connection of the first video signal cable to the first video signal terminal and a second connection of the second video signal cable to the second video signal terminal;
a first video signal switch configured to connect the first video signal terminal to either the input terminal or the output terminal;
a second video signal switch configured to connect the second video signal terminal to either the input terminal or the output terminal; and
a processor configured to, according to a sensing by the detection sensor:
control the first video signal switch to connect the first video signal terminal to one of the input terminal and the output terminal; and
control the second video signal switch to connect the second video signal terminal to another one of the input terminal and the output terminal,
wherein the detection sensor is configured to sense a first input of the first video signal to the first video signal terminal and a second input of the second video signal to the second video signal terminal,
wherein the processor is further configured to, based on the detection sensor sensing the first input before the second input:
control the first video signal switch to connect the first video signal terminal to the input terminal; and
control the second video signal switch to connect the second video signal terminal to the output terminal, and
wherein the processor is further configured to, based on the detection sensor sensing the second input before the first input:
control the second video signal switch to connect the second video signal terminal to the input terminal; and
control the first video signal switch to connect the first video signal terminal to the output terminal.

7. A control method for a video device comprising a pixel conversion circuit including an input terminal for receiving a video signal and an output terminal for outputting the video signal, the control method comprising:
sensing a first connection of a first video signal cable to a first video signal terminal of the video device and a second connection of a second video signal cable to a second video signal terminal of the video device, the second video signal cable differing from the first video signal cable, and the second video signal terminal having a same shape as a shape of the first video signal terminal;
according to the sensing, connecting the first video signal terminal to one of the input terminal and the output terminal, and connecting the second video signal terminal to another one of the input terminal and the output terminal;
based on sensing the first connection before the second connection:
connecting the first video signal terminal to the input terminal; and
connecting the second video signal terminal to the output terminal; and
based on sensing the second connection before the first connection:
connecting the second video signal terminal to the input terminal; and
connecting the first video signal terminal to the output terminal.

8. The control method according to claim 7, further comprising:
storing in a memory of the video device, setting information regarding a connection relationship among the first video signal terminal, the second video signal terminal, the input terminal, and the output terminal; and
maintaining the connection relationship until at least one of the first video signal cable and the second video signal cable is disconnected.

9. The control method according to claim 7, wherein the connecting the first video signal terminal to the one of the input terminal and the output terminal includes connecting only the first video signal terminal to the one of the input terminal and the output terminal.

10. The control method according to claim 9, wherein the connecting the second video signal terminal to the other one of the input terminal and the output terminal includes connecting only the second video signal terminal to the other one of the input terminal and the output terminal.

11. A control method for a video device comprising a pixel conversion circuit including an input terminal for receiving a video signal and an output terminal for outputting the video signal, the control method comprising:
sensing a first connection of a first video signal cable to a first video signal terminal of the video device and a second connection of a second video signal cable to a second video signal terminal of the video device, the second video signal cable differing from the first video signal cable, and the second video signal terminal having a same shape as a shape of the first video signal terminal;
according to the sensing, connecting the first video signal terminal to one of the input terminal and the output terminal, and connecting the second video signal terminal to another one of the input terminal and the output terminal;
sensing a first input of a first video signal to the first video signal terminal and a second input of a second video signal to the second video signal terminal;
based on sensing the first input before the second input:
connecting the first video signal terminal to the input terminal; and
connecting the second video signal terminal to the output terminal; and
based on sensing the second input before the first input:

connecting the second video signal terminal to the input terminal; and connecting the first video signal terminal to the output terminal.

12. A control method for a video device comprising a pixel conversion circuit including an input terminal for receiving a video signal and an output terminal for outputting the video signal, the control method comprising:

sensing a first connection of a first video signal cable to a first video signal terminal of the video device and a second connection of a second video signal cable to a second video signal terminal of the video device, the second video signal cable differing from the first video signal cable; and based on which of the first connection and the second connection is sensed first, connecting one of the first video signal terminal and the second video signal terminal to the input terminal, and connecting an other one of the first video signal terminal and the second video signal terminal to the output terminal.

13. The control method according to claim 12, further comprising:

storing setting information regarding a connection relationship among the first video signal terminal, the second video signal terminal, the input terminal, and the output terminal; and maintaining the connection relationship until at least one of the first video signal cable and the second video signal cable is disconnected.

14. The control method according to claim 12, further comprising:

based on sensing the first connection before the second connection:

connecting the first video signal terminal to the input terminal; and connecting the second video signal terminal to the output terminal; and based on sensing the second connection before the first connection:

connecting the second video signal terminal to the input terminal; and connecting the first video signal terminal to the output terminal.

15. The control method according to claim 12, further comprising:

sensing a first input of a first video signal to the first video signal terminal via the first video signal cable and a second input of a second video signal to the second video signal terminal via the second video signal cable;

based on sensing the first input before the second input:

connecting the first video signal terminal to the input terminal; and connecting the second video signal terminal to the output terminal; and based on sensing the second input before the first input:

connecting the second video signal terminal to the input terminal; and connecting the first video signal terminal to the output terminal.

16. The control method according to claim 12, wherein, in the connecting the one of the first video signal terminal and the second video signal terminal to the input terminal, only the one of the first video signal terminal and the second video signal terminal is connected to the input terminal.

17. The control method according to claim 16, wherein, in the connecting the other one of the first video signal terminal and the second video signal terminal to the output terminal, only the other one of the first video signal terminal and the second video signal terminal is connected to the output terminal.

18. The control method according to claim 12, wherein, in the connecting the other one of the first video signal terminal and the second video signal terminal to the output terminal, only the other one of the first video signal terminal and the second video signal terminal is connected to the output terminal.

* * * * *